May 22, 1945.  C. J. ROCQUIN  2,376,555
BARRIER DRAIN
Filed Aug. 14, 1944  2 Sheets-Sheet 1
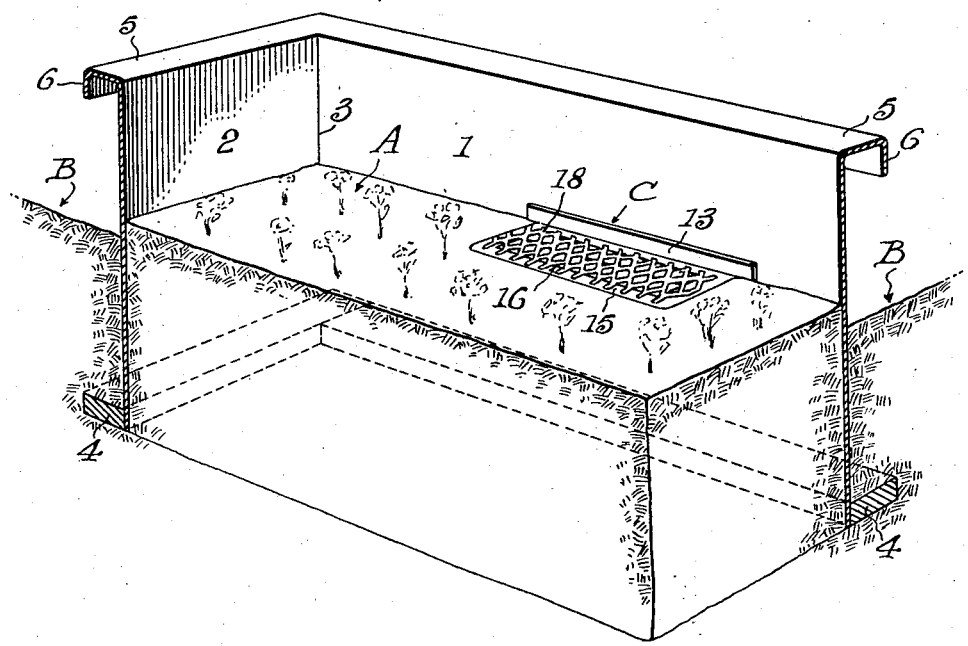
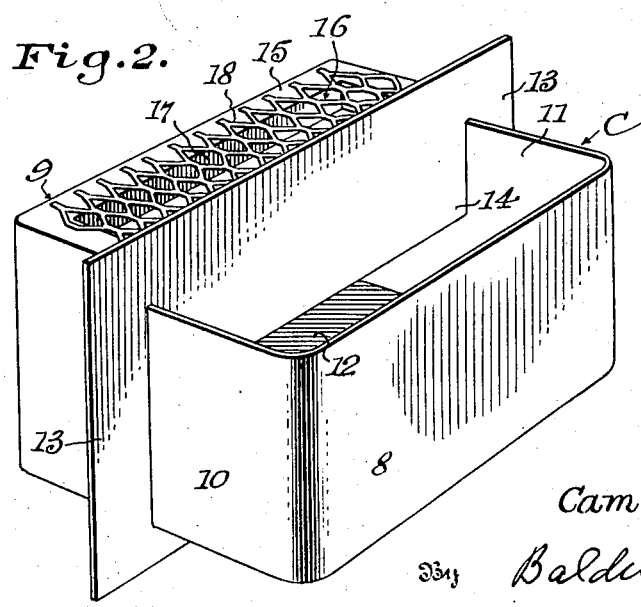
Inventor
Camille J. Rocquin
By Baldwin & Wight
his Attorneys May 22, 1945.   C. J. ROCQUIN   2,376,555
BARRIER DRAIN
Filed Aug. 14, 1944   2 Sheets-Sheet 2
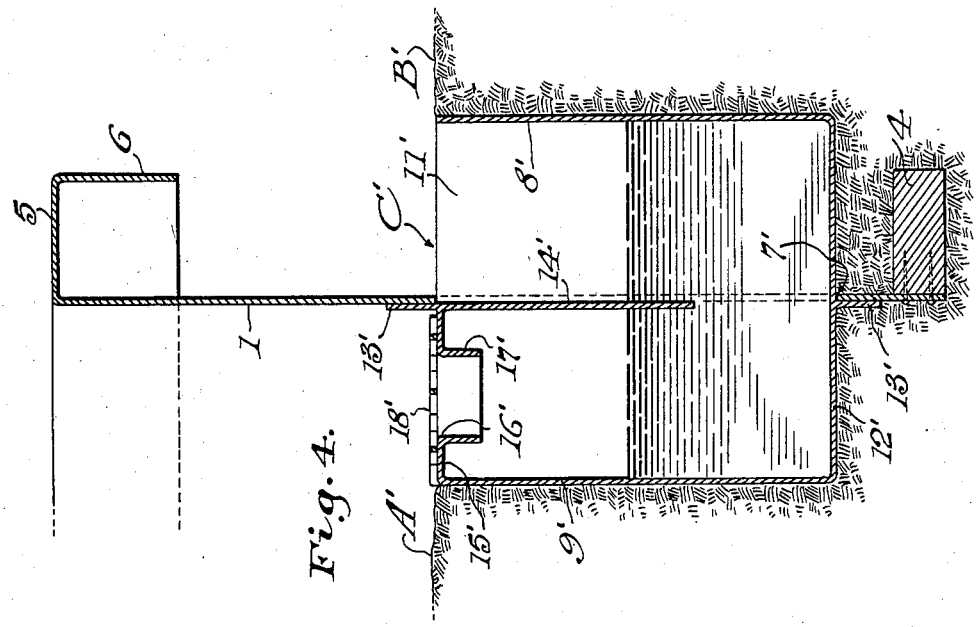
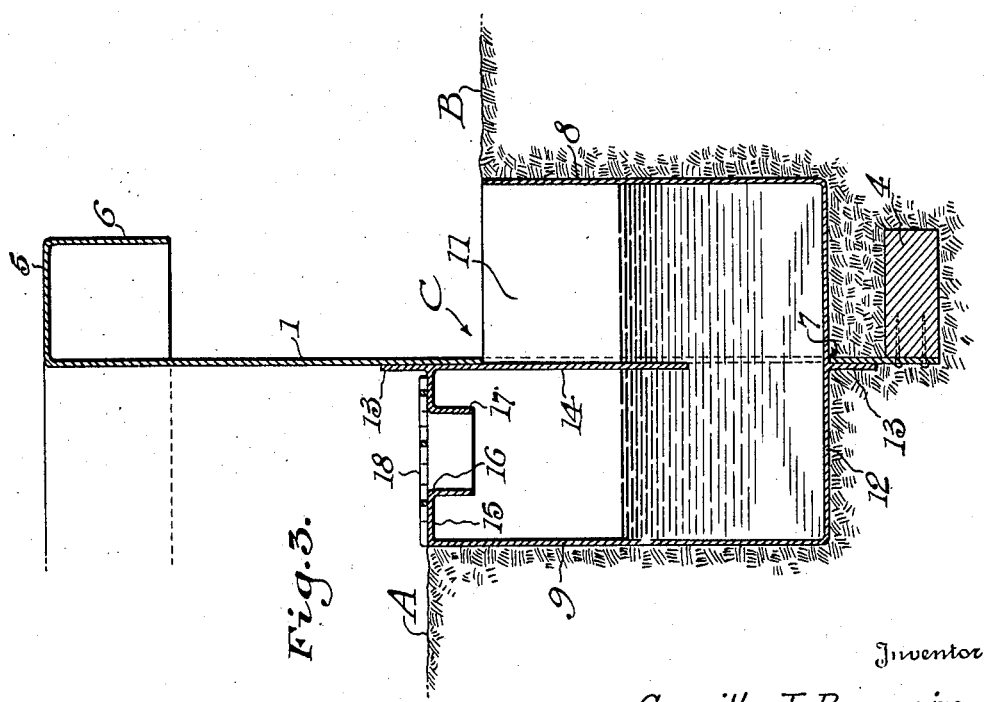
Inventor
Camille J. Rocquin
By Baldwin & Wight
His Attorneys Patented May 22, 1945

2,376,555

UNITED STATES PATENT OFFICE 2,376,555

BARRIER DRAIN

Camille J. Rocquin, New Orleans, La.

Application August 14, 1944, Serial No. 549,401

14 Claims. (Cl. 47—1)

This invention relates to barrier drains and more particularly to devices for draining excess surface moisture from insect-free plant growing areas to adjacent areas without permitting migration of crawling insects from such adjacent areas to the growing areas. Drains embodying the invention are particularly adapted for use in connection with barriers employed for insulating growing areas against inroads by the white fringed beetle.

One approved form of barrier now in use for protecting heeling-in or growing areas comprises a continuous vertical wall or a series of connected vertical walls surrounding the growing area and extending from a level considerably below the surface of the growing area and the adjacent or surrounding area to a level well above the surface and being formed at the top with a horizontally projecting ledge from the outer edge of which a flange or apron depends. The barrier must be impassable to the beetles and usually is made of sheet metal.

Heretofore attempts have been made to provide for drainage of excess moisture from the growing area by forming the barrier with a slit or opening at or just above the growing area surface, and covering the slit or opening with a screen. In order to prevent insects, for example white fringed beetles, from passing through the screen the screen used was of very fine mesh. The fineness of the mesh made the screen easily clogged by leaves, bits of earth, and similar stray particles or objects.

An object of the present invention is to provide a barrier structure of the general class referred to above equipped with an improved device capable of providing for free drainage of excess moisture from the growing area without, however, permitting migration of insects from an adjacent area to the growing area.

Another object of the invention is to provide a structure of the character stated which is adapted to be used in barriers installed between growing areas with relatively high surface levels and adjacent areas with relatively low surface levels.

Another object of the invention is to provide a drain device of the character referred to which is constructed as a unit and which is easily insertable in a sub-surface opening in a barrier wall.

Other objects will become apparent from a reading of the following detail description, the appended claims, and the accompanying drawings, in which:

Figure 1 is a perspective view, partly in section, showing a barrier equipped with a drain device unit embodying the invention, parts of the barrier being omitted for clearness of illustration;

Figure 2 is a perspective view of the drain device unit;

Figure 3 is a vertical section through one barrier wall and the drain device associated therewith in connection with a growing area whose surface is higher than that of the adjacent area; and Figure 4 is a view similar to Figure 3 but showing a slightly modified form of drain device adapted for use where the growing area is at the same level as the adjacent area.

In the embodiment shown in Figures 1, 2, and 3, a growing area A is insulated against migration of insects from an adjacent area B by a barrier including side walls 1 and end walls 2 welded at the corners as at 3. The barrier is of generally rectangular form but only one side wall and one end wall are shown, it being understood that their counterparts are disposed symmetrically in the complete barrier structure.

The barrier must be impervious to the passage of small insects such as, for example, the white fringed beetle, and preferably is constructed of sheet metal pieces, the bottom edges of which are anchored to timbers 4 buried in the ground. The upper edges of the barrier walls are formed with horizontal ledges 5 from the outer edges of which depend flanges or aprons 6 overhanging the adjacent area B.

A drain device C comprises a well member inserted in an opening 7 in one barrier wall 1 and extending to both sides of the wall 1 below the surfaces of the areas A and B. The well member C includes sides 8 and 9, ends 10 and 11, and a bottom 12, but at its top is open to the surfaces of both areas A and B. Because the area A is slightly higher than the area B the well walls are somewhat higher on the growing area side of the barrier wall 1.

The well member C preferably is equipped or formed with means for accurately and conveniently locating the well member with respect to the associated barrier wall so as to be disposed at the proper level relative to the areas A and B and so as to project the desired distances on opposite sides of the barrier wall. In the form shown, the locating means comprises an attaching flange 13 which preferably extends continuously around and outside the well end walls 10 and 11, and the bottom 12, and across the top of the well. In order to mount the well member on the barrier wall, the well member is inserted through the openings 7 from left to right as viewed in Figure 3 until the flange 13 abuts the barrier wall 1. The flange 13 is then welded or otherwise securely connected to the wall 1.

The well member C is formed or provided with a division wall 14 which extends lengthwise of the member C and, as shown, parallel to the associated barrier wall 1. The wall 14 projects downwardly into the well but terminates sufficiently short of the bottom 12 to provide for free drainage of water from the growing area A through the well and to the adjacent area B. It will be understood that excess surface water will flow from the growing area A down through the top of the well member C, under the division wall 14, thence up through the well member, and thence to the adjacent area B. When the excess moisture has been drained from the area A, a considerable amount will remain in the well and normally this residual water will be sufficient to extend up above the lower edge of the division wall 14, thereby providing an effective seal for preventing insects from migrating from the area B through the well C to the area A.

Preferably the portion of the well member C on the growing area side of the barrier wall is provided with a top wall or cover 15 formed with an opening 16 large enough to provide for free flow and drainage of water from the growing area. The top 15 is formed with a depending flange 17 which extends continuously around the opening 16 and is spaced at all points from the division wall 14 and the walls 9, 10, and 11. If during a prolonged dry spell the residual water in the well should evaporate, any insects crawling through the well over the surfaces of its walls or the division wall 14 will encounter the flange 17 as an obstacle so that their further travel will be prevented or discouraged. In practice, it is desirable to add water to the well if the residual water evaporates, but if this precaution is not taken promptly, the obstacle flange 17 provides an additional safeguard against insects reaching the growing area.

In order to prevent leaves, twigs, and sizable particles of earth from entering the well and clogging it, a screen 18 is positioned over the opening 16. In accordance with the invention the screen should be provided with openings sufficiently small to keep out objects large enough to clog the well but not so small as to substantially prevent seepage or drainage of water when the screen is covered by leaves, twigs, or the like. The size of the screen openings should be determined on the basis of the aforementioned factors and should not be made so small as to prevent the passage of insects, as has previously been the practice. Because of the effective obstacles provided by the well with the division wall 14 extending into the residual water, and the depending flange 17, it is unnecessary for the screen 18 to hold back the insects. The preferred form of screen comprises ordinary expanded metal of the kind used in building construction.

The modified structure shown in Figure 4 is the same as that described with reference to Figures 1 to 3 inclusive with the exception that the top of the well member C' is at the same level on both sides of the barrier in order to be properly accommodated to the growing area A' and adjacent area B' which are at substantially the same level. Parts of the well member unit C' which correspond to similar parts of the well member C are designated by the same reference characters with the exception that the reference characters denoting the parts of the unit C' are primed.

The dimensions of the well member units embodying the invention will vary according to the conditions to be dealt with, e. g. the size of the area to be drained, the nature of the soil, and the expected intensity of rainfall. It will be apparent that drain device units embodying the invention may be used in connection with barrier structures differing from the structure shown herein and that some changes in the structure of the unit may be made without departing from the invention as defined in the claims.

I claim:

1. In a structure for protecting a growing area against migration of insects from an adjacent area to said growing area and for maintaining said growing area drained of excess surface moisture, a barrier extending lengthwise along the dividing line between said areas and projecting below and above said areas; a well member open at its top to both said areas; and a division wall extending downwardly into the well throughout the length thereof and terminating sufficiently short of the well bottom to provide for free drainage of water from said growing area through said well and to said adjacent area.

2. In a structure for protecting a growing area against migration of insects from an adjacent area to said growing area and for maintaining said growing area drained of excess surface moisture, a barrier extending lengthwise along the dividing line between said areas and projecting below and above said areas; a well member open at its top to both said areas; a division wall extending downwardly into the well throughout the length thereof and terminating sufficiently short of the well bottom to provide for free drainage of water from said growing area through said well and to said adjacent area; and a screen over the top of said well on the growing area side of said barrier, said screen being formed with openings sufficiently small to keep out objects large enough to clog said well but not so small as to substantially prevent seepage of water when covered by leaves or the like.

3. In a structure for protecting a growing area against migration of insects from an adjacent area to said growing area and for maintaining said growing area drained of excess surface moisture, a barrier extending lengthwise along the dividing line between said areas and projecting below and above said areas; a well member open at its top to both said areas; a division wall extending downwardly into the well throughout the length thereof and terminating sufficiently short of the well bottom to provide for free drainage of water from said growing area through said well and to said adjacent area; a top wall on said well on the growing area side of said barrier; an opening in said top wall; and a depending flange extending continuously around the margin of said opening and being spaced horizontally at all points from the well walls and said division wall.

4. In a structure for protecting a growing area against migration of insects from an adjacent area to said growing area and for maintaining said growing area drained of excess surface moisture, a barrier extending lengthwise along the dividing line between said areas and projecting below and above said areas; an opening in said barrier below the level of the growing area; and a well member inserted in said opening to extend below and to be open at its top to both said areas, said well member being equipped with means for preventing migration of insects from said adjacent area to said growing area and having attaching means abutting said barrier adjacent said opening therein.

5. In a structure for protecting a growing area against migration of insects from an adjacent area to said growing area and for maintaining said growing area drained of excess surface moisture, a barrier extending lengthwise along the dividing line between said areas and projecting below and above said areas; an opening in said barrier below the level of the growing area; and a well member inserted in said opening to extend below and to be open at its top to both said areas, said well member having a division wall extending downwardly into the well throughout the length thereof and terminating sufficiently short of the well bottom to provide for free drainage of water from said growing area through said well and to said adjacent area, and said well member having attaching means adapted to abut said barrier adjacent said opening therein.

6. In a structure for protecting a growing area against migration of insects from an adjacent area to said growing area and for maintaining said growing area drained of excess surface moisture, a barrier extending lengthwise along the dividing line between said areas and projecting below and above said areas; an opening in said barrier below the level of the growing area; and a well member inserted in said opening to extend below and to be open at its top to both said areas, said well member being equipped with means for preventing migration of insects from said adjacent area to said growing area and having an attaching flange extending continuously outside the top, bottom, and ends of said member and abutting said barrier continuously around said opening therein.

7. In a structure for protecting a growing area against migration of insects from an adjacent area to said growing area and for maintaining said growing area drained of excess surface moisture, a barrier extending lengthwise along the dividing line between said areas and projecting below and above said areas; an opening in said barrier below the level of the growing area; and a well member inserted in said opening to extend below and to be open at its top to both said areas, said well member having a division wall extending downwardly into the well and terminating sufficiently short of the well bottom to provide for drainage of water from said growing area through said well and to said adjacent area, and said member having attaching means abutting said barrier adjacent the opening therein.

8. A structure as claimed in claim 1 for use where the growing area is at a higher level than the adjacent area and in which structure the well member is higher on the growing area side of the barrier than on said adjacent area side thereof.

9. A device adapted to be inserted in an opening in an insect barrier positioned between a growing area and an adjacent area for draining excess surface moisture from the growing area to the adjacent area without permitting migration of insects from said adjacent area to said growing area, said device comprising a well member open at its top and being adapted to be mounted in said barrier opening to extend lengthwise along said barrier and to project on both sides of said barrier with the top of the well open both to said growing area and to said adjacent area; and a division wall extending downwardly into the well throughout the length thereof and terminating sufficiently short of the well bottom to provide for free drainage of water from said growing area through said well and to said adjacent area.

10. A device adapted to be inserted in an opening in an insect barrier positioned between a growing area and an adjacent area for draining excess surface moisture from the growing area to the adjacent area without permitting migration of insects from said adjacent area to said growing area, said device comprising a well member open at its top and being adapted to be mounted in said barrier opening to extend lengthwise along said barrier and to project on both sides of said barrier with the top of the well open both to said growing area and to said adjacent area; a division wall extending downwardly into the well throughout the length thereof and terminating sufficiently short of the well bottom to provide for free drainage of water from said growing area through said well and to said adjacent area; and a screen on the top of that portion of said well member which in use projects to the growing area side of said barrier.

11. A device adapted to be inserted in an opening in an insect barrier positioned between a growing area and an adjacent area for draining excess surface moisture from the growing area to the adjacent area without permitting migration of insects from said adjacent area to said growing area, said device comprising a well member open at its top and being adapted to be mounted in said barrier opening to extend lengthwise along said barrier and to project on both sides of said barrier with the top of the well open both to said growing area and to said adjacent area; a division wall extending downwardly into the well throughout the length thereof and terminating sufficiently short of the well bottom to provide for free drainage of water from said growing area through said well and to said adjacent area; a top on said well on the growing area side of said division wall; an opening in said top wall; and a depending flange extending continuously around the margin of said opening and being spaced horizontally at all points from the well walls and said division wall.

12. A device adapted to be inserted in an opening in an insect barrier positioned between a growing area and an adjacent area for draining excess surface moisture from the growing area to the adjacent area without permitting migration of insects from said adjacent area to said growing area, said device comprising a well member open at its top and being adapted to be mounted in said barrier opening to extend lengthwise along said barrier and to project on both sides of said barrier with the top of the well open both to said growing area and to said adjacent area; a division wall extending downwardly into the well throughout the length thereof and terminating sufficiently short of the well bottom to provide for free drainage of water from said growing area through said well and to said adjacent area; and an attaching flange extending continuously outside the top, bottom, and ends of said well member and being adapted to abut the barrier continuously around said opening therein.

13. A device adapted to be inserted in an opening in an insect barrier positioned between a growing area and an adjacent area for draining excess surface moisture from the growing area to the adjacent area without permitting migration of insects from said adjacent area to said growing area, said device comprising a well member open at its top and being adapted to be mounted in said barrier opening to extend lengthwise along said barrier and to project on both sides of said barrier with the top of the well open both to said growing area and to said adjacent area; a division wall extending downwardly into the well throughout the length thereof and terminating sufficiently short of the well bottom to provide for free drainage of water from said growing area through said well and to said adjacent area; and means fast with said well member and being adapted to abut the barrier adjacent said opening therein for locating said well member in said barrier opening to extend lengthwise along said barrier and to project on both sides of said barrier with the top of the well open to both said growing area and to said adjacent area.

14. A structure as claimed in claim 9 in which the well member is higher on the growing area side of the division wall than on the adjacent area side thereof.

CAMILLE J. ROCQUIN.